(12) United States Patent
Glugla (10) Patent No.: US 9,631,572 B2
(45) Date of Patent: Apr. 25, 2017

(54) METHOD AND SYSTEM FOR PRE-IGNITION CONTROL

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 14/289,290

(22) Filed: May 28, 2014

(65) Prior Publication Data

US 2015/0345419 A1    Dec. 3, 2015

(51) Int. Cl.
| | | |
|---|---|---|
| *F02B 3/00* | (2006.01) | |
| *F02D 41/30* | (2006.01) | |
| *F02D 35/02* | (2006.01) | |
| *F02D 41/40* | (2006.01) | |
| *F02D 41/00* | (2006.01) | |

(52) U.S. Cl.
CPC ....... *F02D 41/3094* (2013.01); *F02D 35/021* (2013.01); *F02D 35/027* (2013.01); *F02D 35/028* (2013.01); *F02D 41/0025* (2013.01); *F02D 41/403* (2013.01); *Y02T 10/44* (2013.01)

(58) Field of Classification Search
CPC .............. F02D 35/027; F02D 41/0025; F02D 41/3094; F02D 19/081; F02D 19/0692; F02D 19/084; F02D 19/0655; Y02T 10/36; Y02T 10/44
USPC .......... 123/294, 295, 299, 305, 406.29, 431, 123/435, 436, 3, 574–578; 701/104, 111
See application file for complete search history.

(56) References Cited

U.S. PATENT DOCUMENTS

| | | | |
|---|---|---|---|
| 8,439,011 B2 | 5/2013 | Glugla et al. | |
| 8,543,315 B2 | 9/2013 | Glugla et al. | |
| 2007/0119421 A1* | 5/2007 | Lewis | F01N 11/002 123/431 |
| 2007/0215110 A1* | 9/2007 | Stein | F02D 19/0628 123/431 |
| 2011/0067674 A1* | 3/2011 | Kasseris | F02B 47/04 123/436 |
| 2011/0139118 A1* | 6/2011 | Glugla | F02D 35/027 123/406.29 |
| 2011/0265453 A1* | 11/2011 | Uhrich | F01N 3/0842 60/274 |
| 2011/0265758 A1* | 11/2011 | Glugla | F02B 23/104 123/299 |
| 2011/0313641 A1* | 12/2011 | Glugla | F02D 35/02 701/104 |
| 2012/0245827 A1* | 9/2012 | Glugla | F02D 41/3094 701/105 |
| 2014/0000552 A1 | 1/2014 | Glugla et al. | |

* cited by examiner

*Primary Examiner* — Marguerite McMahon
*Assistant Examiner* — James Kim
(74) *Attorney, Agent, or Firm* — Julia Voutyras; McCoy Russell LLP (57) ABSTRACT

Methods and systems are provided for enriching an engine cylinder in response to an indication of pre-ignition. The cylinder is enriched by initially increasing a proportion of fuel delivered to the cylinder via a port injector on an open intake valve event. The cylinder is then continued to be enriched by increasing a proportion of fuel delivered to the cylinder via a direct injector.

19 Claims, 4 Drawing Sheets

METHOD AND SYSTEM FOR PRE-IGNITION CONTROL

FIELD

The present description relates generally to methods and systems for controlling a vehicle engine in response to pre-ignition detection.

BACKGROUND/SUMMARY

Under certain operating conditions, engines that have high compression ratios, or are boosted to increase specific output, may be prone to low speed pre-ignition combustion events. The early combustion due to pre-ignition can cause very high in-cylinder pressures, and can result in combustion pressure waves similar to combustion knock, but with larger intensity. Strategies have been developed for prediction and/or early detection of pre-ignition based on engine operating conditions. Additionally, following detection, various pre-ignition mitigating steps may be taken.

In one approach, as shown by Glugla et al. in US 20120245827, in an engine system configured to receive fuel via direct injection, in response to an indication of pre-ignition, the engine is operated in a split injection mode. Specifically, the pre-ignition affected cylinder is enriched by providing a rich fuel injection over multiple direct injections instead of a single direct injection. Fueling of one or more other cylinders is then adjusted to maintain an exhaust air-fuel ratio at or around stoichiometry.

However the inventors herein have recognized issues with such an approach. While the charge cooling effect of the direct injection improves pre-ignition mitigation, it also generates more particulate matter emissions (or soot) due to diffuse flame propagation wherein fuel may not adequately mix with air prior to combustion. Since direct injection, by nature, is a relatively late fuel injection, there may be insufficient time for mixing of the injected fuel with air in the cylinder. Similarly, the injected fuel may encounter less turbulence when flowing through the valves. Consequently, there may be pockets of rich combustion that may generate soot locally, degrading exhaust emissions. Since the pre-ignition mitigating direct injection is a rich fuel injection, the propensity of degraded emissions is higher. The inventors have further recognized that in engine systems configured with port and direct injection systems, the charge cooling properties of the port injection system can also be leveraged to address pre-ignition. In particular, the charge cooling properties of a port injection performed on an open intake valve can be used to provide at least some of the pre-ignition mitigating cylinder cooling without incurring significant particulate matter emissions.

Thus in one example, pre-ignition mitigation may be improved in an engine system configured for port and direct injection of fuel. The method may comprise: in response to an indication of pre-ignition, enriching a cylinder by increasing a ratio of port injected fuel relative to direct injected fuel for a number of enrichment cycles.

As an example, in response to an indication of pre-ignition, on an immediately subsequent engine cycle, the pre-ignition affected cylinder may be enriched by increasing a ratio of fuel delivered to the cylinder via port injection. For example, the pulse width of the port injector may be increased, if possible. In addition, the port injection may be timed to occur during an open intake valve event to increase the charge cooling effect of the port injected fuel. At the same time, direct injection of fuel may be also be increased. As an example, an engine may be operating with a portion of the fuel requirement delivered via port injection on a closed intake valve (e.g., during an exhaust stroke) and a remaining portion of fuel requirement delivered via direct injection during an intake stroke and/or a compression stroke. In response to the indication of pre-ignition, the amount of fuel port injected may be increased while the timing of port fuel injection is shifted to an open intake valve (e.g., during an intake stroke). In addition, the amount of fuel that is direct injected is also increased with the portion of fuel injected in the intake stroke increased and the portion of fuel injected in the compression stroke decreased. For example, fuel may be direct injected in the intake stroke only and no fuel may be direct injected in the compression stroke. If the pulse width of the port injector cannot be increased on the immediately subsequent engine cycle, increased direct injection of fuel may be used initially to address the pre-ignition. The relative increase in port injection may be higher than the relative increase in direct injection for a first number of enrichment cycles (e.g., the first enrichment cycle following the indication of pre-ignition). Thereafter, a ratio of fuel delivered as a port injection relative to a direct injection may be adjusted over a number of enrichment cycles to increase charge cooling. For example, fuel may be delivered with a higher ratio of direct injected fuel relative to port injected fuel for a number of engine cycles until a pre-ignition propensity falls. Thereafter, nominal engine fueling may be resumed.

In this way, by adjusting the ratio of an enriched fuel injection delivered to an engine via port injection relative to direct injection, the charge cooling properties of a port injection can be better leveraged for pre-ignition mitigation. By injecting at least some fuel via a port injector on an open intake valve event in response to an indication of pre-ignition, exhaust particulate matter emissions may be reduced. Specifically, by trading off a portion of the enrichment that was to be direct injected with fuel that is port injected, pre-ignition can be addressed without increasing exhaust particulate matter emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
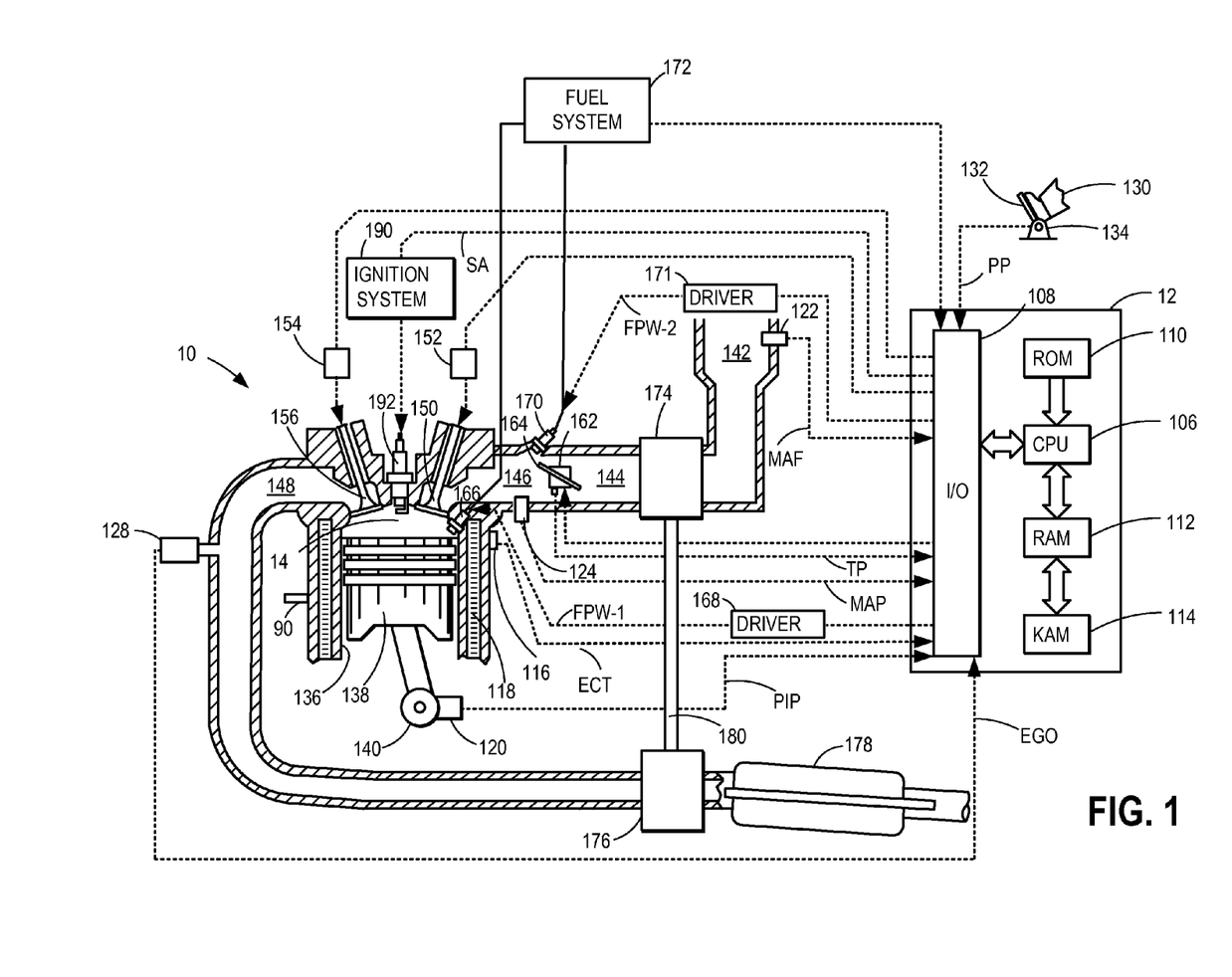
FIG. 1 shows a combustion chamber of an example engine system configured for port and direct injection of fuel.
Figure 3:
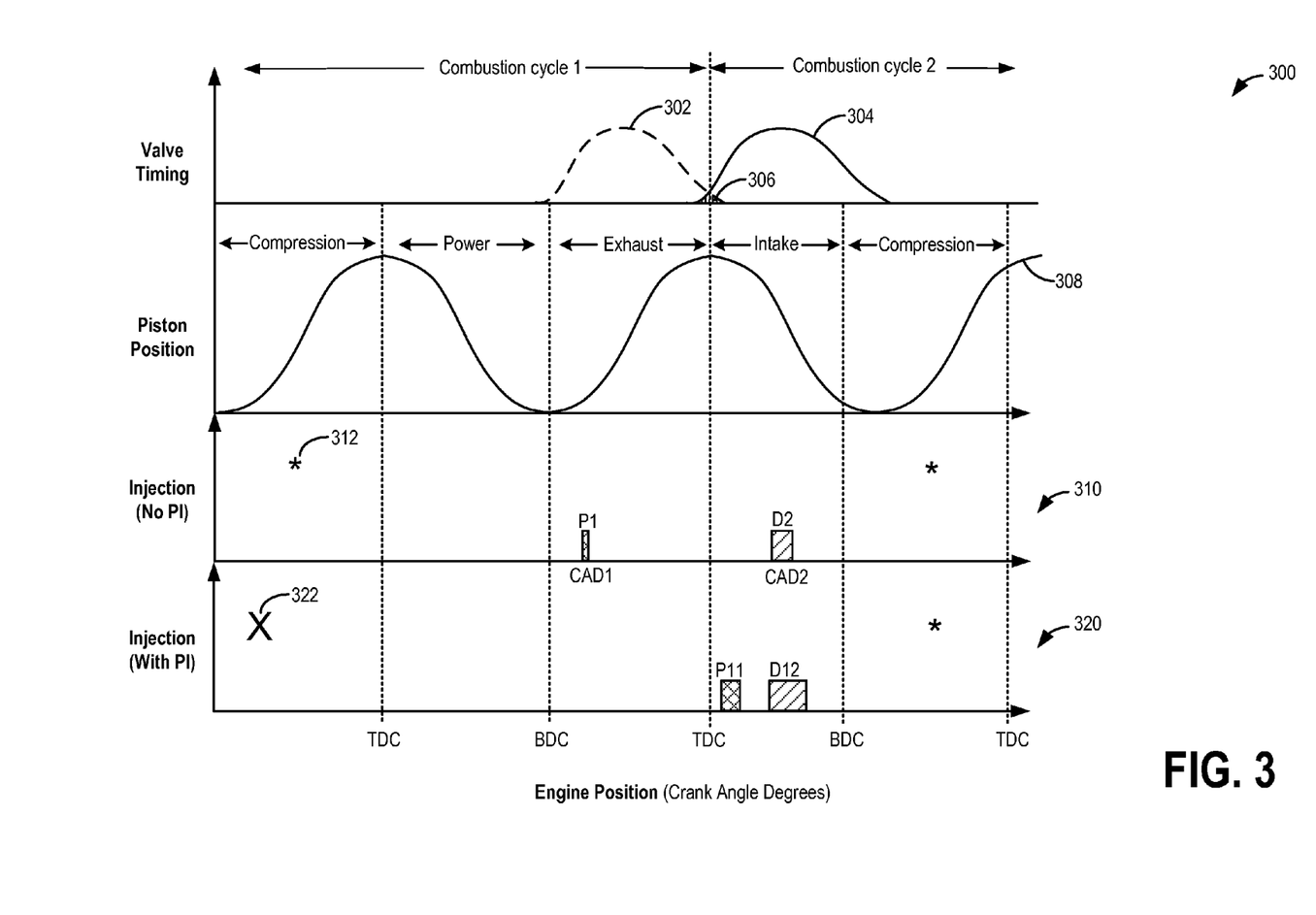
FIGS. 3 and 4 show example pre-ignition mitigating fueling adjustments.
Figure 4:
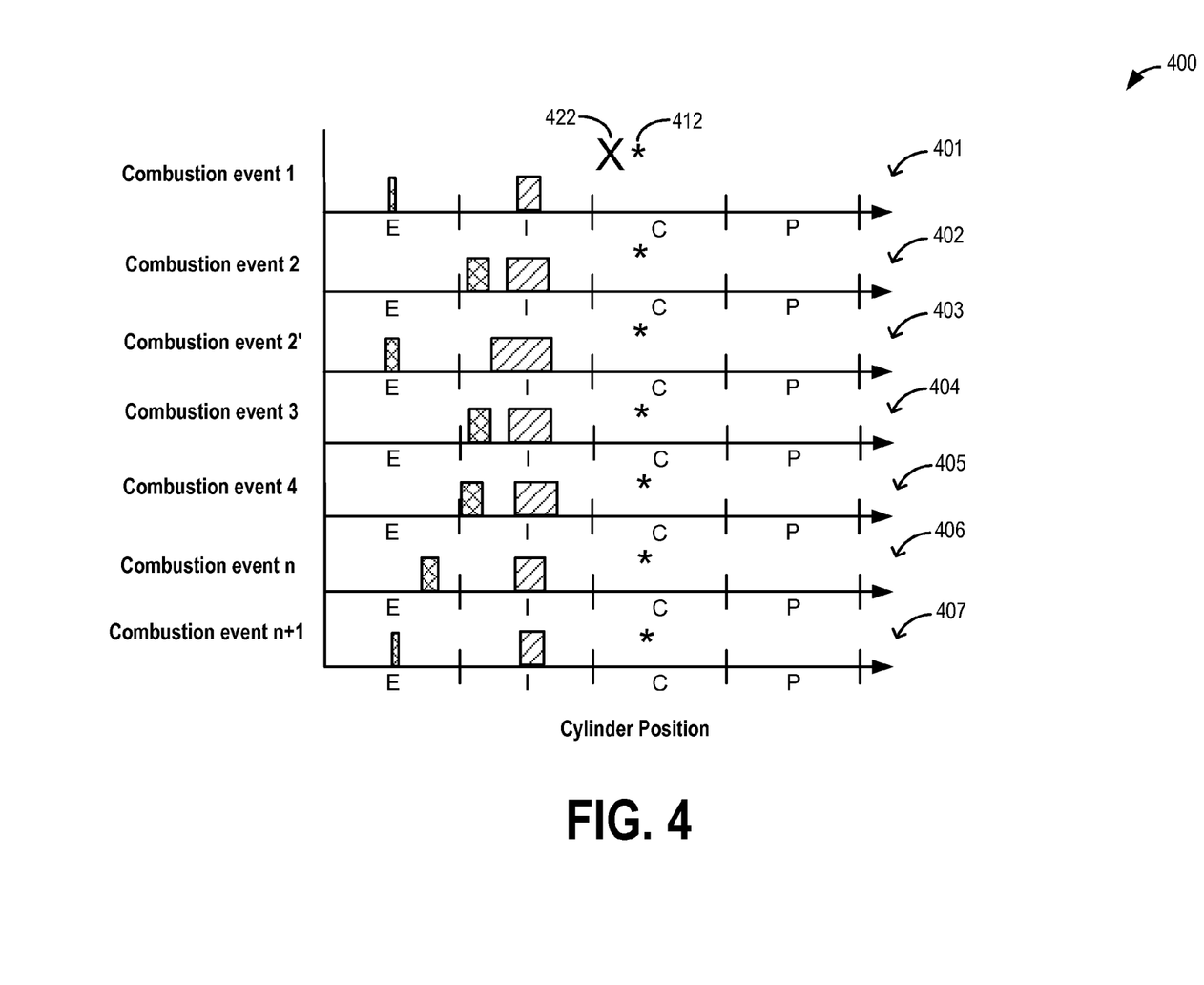

The following description relates to systems and methods for adjusting an engine fuel enrichment via a port injector and a direct injector in response to an indication of pre-ignition, such as in the engine system of FIG. 1. An engine controller may perform a control routine, such as the routine of FIG. 2, to adjust a fuel injection profile, including an amount of fuel port injected to a cylinder and an amount of fuel direct injected into a pre-igniting cylinder for a number of engine cycles following the indication of pre-ignition. Example profiles are shown at FIGS. 3 and 4.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load and/or knock, such as described herein below. The relative distribution of the total injected fuel among injectors 166 and 170 may be referred to as a first injection ratio. For example, injecting a larger amount of the fuel for a combustion event via (port) injector 170 may be an example of a higher first ratio of port to direct injection, while injecting a larger amount of the fuel for a combustion event via (direct) injector 166 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation.

Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke, or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tank in fuel system 172 may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc.

Moreover, fuel characteristics of the fuel tank may vary frequently. In one example, a driver may refill fuel system 172 with E85 one day, and E10 the next, and E50 the next. The day to day variations in tank refilling can thus result in frequently varying fuel compositions of fuel in fuel system 172, thereby affecting the injection profile of fuel delivered by injectors 166 and 170.

Engine 10 may further include one or more knock sensors 90 distributed along an engine block, or coupled to individual cylinders (as shown). When included, the plurality of knock sensors may be distributed symmetrically or asymmetrically along the engine block. Knock sensor 90 may be an accelerometer, or an ionization sensor, or a cylinder pressure sensor. An engine controller may be configured to detect and differentiate abnormal combustion events due to cylinder knocking from those indicative of cylinder pre-ignition based on the output (e.g., signal timing, amplitude, intensity, frequency, etc.) of knock sensor 90, and further based on the output of a crankshaft acceleration sensor. For example, a cylinder pre-ignition event may be determined based on a cylinder knock signal estimated in a first, earlier window (such as a first window before a spark ignition event in the cylinder) being larger than a first, higher threshold, while a cylinder knock event may be determined based on a cylinder knock signal estimated in a second, later window (such as a second window after a spark ignition event in the cylinder) being larger than a second, lower threshold. In one example, the windows in which the knock signals are estimated may be crank angle windows.

Mitigating actions taken by the engine controller to address knock may differ from those taken by the controller to address pre-ignition. For example, knock may be addressed using spark ignition timing adjustments (e.g., spark retard) and EGR, while pre-ignition may be addressed using load-limiting, fuel enrichment (as elaborated in FIG. 2), fuel enleanment, or a combination thereof.

Figure 2:
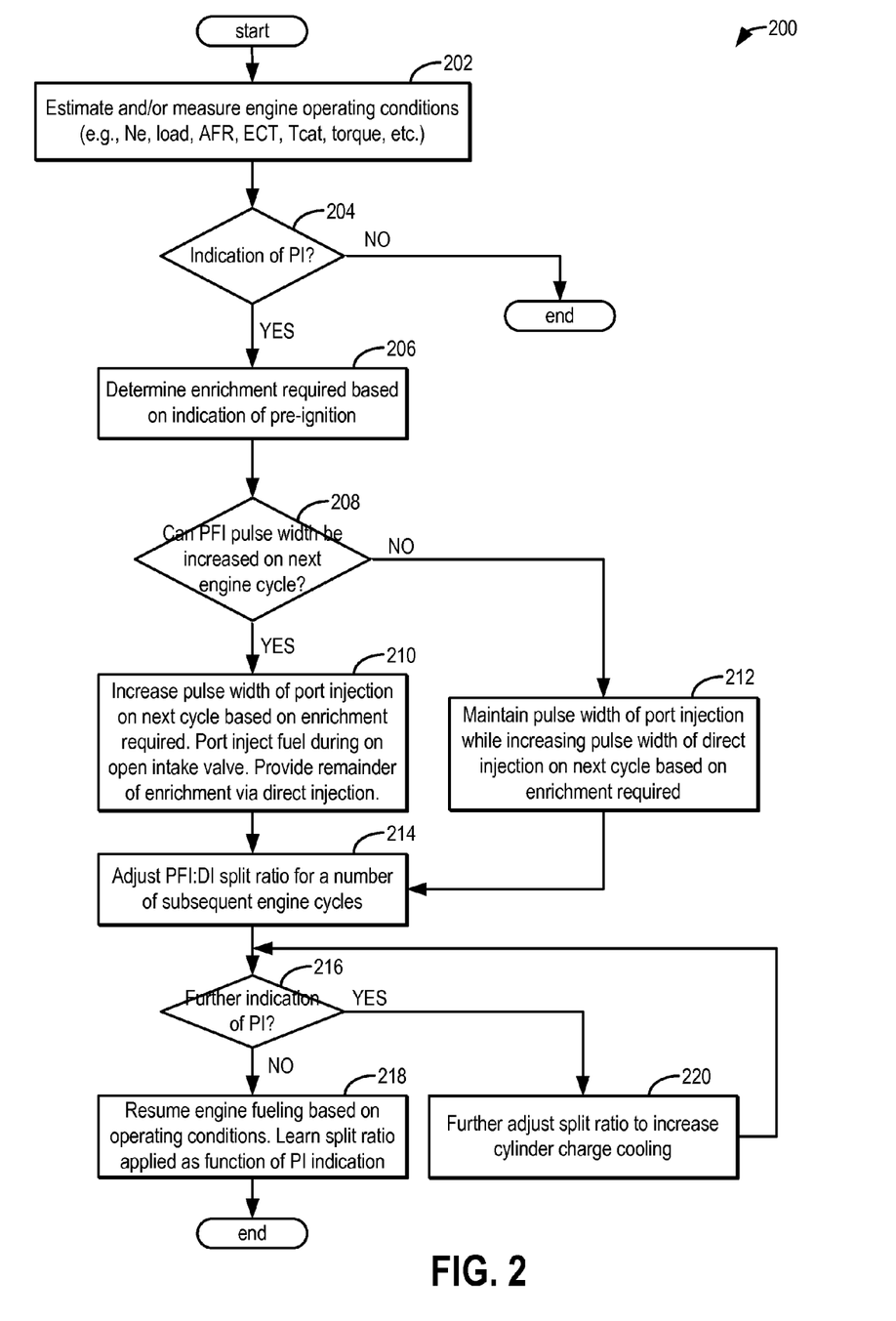
FIG. 2 shows a high level flow chart for adjusting fuel split ratio in response to an indication of pre-ignition.

As elaborated with reference to FIG. 2, a controller may adjust a fuel enrichment injection profile during a first engine cycle immediately following an indication of pre-ignition to use at least some port injection to provide a pre-ignition mitigating cylinder charge cooling. In particular, a controller may enrich a cylinder by selectively increasing a ratio of port injected fuel relative to direct injected fuel for a number of enrichment cycles in response to the indication of pre-ignition. The controller may selectively increase the ratio of port injected fuel by selectively increasing a pulse width of a port injector coupled to the cylinder while maintaining a pulse width of a direct injector coupled to the cylinder. For example, the pulse width of the port injector may be increased if the increased pulse width is within an operating limit of the port injector. Else, if the increased pulse width is outside the operating limit of the port injector, the pulse width of the direct injector may be increased to provide the desired enrichment while maintaining the pulse width of the port injector at the operating limit. In either case, the increase in the pulse width of the injector (port or direct) may be based on the indication of pre-ignition. To further leverage the charge cooling properties of the port injection, the enrichment may be provided by increasing an amount of fuel that is port injected during an open intake valve event. The increased port injection may then be maintained for a number of enrichment cycles, such as a first number, the first number based on the indication of pre-ignition. In one example, the first number is one, such that the indication of pre-ignition is received on a first engine cycle and the pulse width of the port injector is increased on, and for, a second engine cycle immediately following the first engine cycle. Then, after the first number of enrichment cycles have elapsed, the ratio of port injected fuel maybe decreased while the ratio of direct injected fuel is increased to provide a further cylinder charge cooling for a second number of enrichment cycles. In some examples, in addition to the injection type, the charge cooling properties of the port injected fuel and the direct injected fuel, when different, may also be leveraged, such as where the fuel that is port injected is a first fuel and the fuel that is direct injected is a second, different fuel. The ratio of port injected fuel and direct injected fuel in the pre-ignition mitigating enrichment may then be further adjusted based on the fuels, such as based on the alcohol content of the first fuel relative to the second fuel. For example, the fuel with the higher heat of vaporization or higher octane would be the fuel that would be injected in higher amounts to take advantage of the fuel's increased charge cooling ability.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. An example routine that may be performed by the controller is described at FIG. 2.

Now turning to FIG. 2, an example routine 200 is shown for using at least some port injection of fuel to provide a part of a pre-ignition mitigating enrichment. This allows the charge cooling properties of a port fuel injection to be leveraged.

At 202, engine operating conditions may be estimated and/or measured. These may include, for example, engine speed, engine temperature, boost level, manifold pressure, manifold airflow, exhaust catalyst temperature, etc.

In some embodiments, a pre-ignition history of the engine may also be retrieved from a look-up table stored in the controller's memory. The look-up table may be updated at regular intervals (e.g., every engine cycle, every 50 miles, every hour, etc.), or in response to an occurrence of cylinder pre-ignition. The engine pre-ignition (PI) count may include a PI count for each cylinder may include details such as an estimate of a total number of pre-ignition events in the cylinder over the present trip, or engine cycle (e.g., a cylinder trip PI count). The engine PI count may further include an estimate of the total number of pre-ignition events in the cylinder over the lifetime of engine operation (e.g., cylinder lifetime PI count). As such, each cylinder's PI count may represent the given cylinder's pre-ignition history, and may correlate with each cylinder's propensity for further pre-ignition events.

At 203, a fuel injection profile may be determined based on the estimated engine operating conditions. This may include determining an amount of fuel to be port injected relative to an amount of fuel to be direct injected into the engine.

At 204, it may be determined if there is an indication of pre-ignition. In one example, the indication of pre-ignition includes the detection of an actual pre-ignition event, though in other examples, the indication may include the determination of a likelihood of pre-ignition (before the pre-ignition event actually occurs). As elaborated with reference to FIG. 1, an engine controller may detect abnormal combustion events related to pre-ignition, and differentiate them from cylinder knocking events, based on the output of one or more engine knock sensors. As one example, an indication of pre-ignition may be confirmed in response to the output of the knock sensor, estimated in a window before a spark ignition event, being higher than a threshold. If an indication of pre-ignition is not confirmed, the routine may be end.

In response to the indication of pre-ignition, at 206, a pre-ignition mitigating enrichment may be determined. Specifically, an amount of fuel that is required to enrich the pre-igniting cylinder and mitigate the pre-ignition indication is determined. The enrichment may include a degree of richness as well as a number of enrichment cycles. The enrichment may be increased as the indication of pre-ignition increases. For example, as the knock sensor output exceeds the pre-ignition threshold, the degree of richness of the enrichment and/or the number of enrichment cycles applied may be increased.

At 208, it may be determined if at least a portion of the enrichment on the engine cycle immediately following the engine cycle where pre-ignition was detected can be provided via port injection. In particular, it may be determined if the pulse width of the port injector can be increased during the immediately next engine cycle and if fuel can be port injected on an open intake valve. In one example, if the pulse width of the port injector is not already at a maximum duty cycle, then further port injection may be possible. Else, if the port injector pulse width is at a limit, no further port injection may be possible. In another example, if there is not enough time to deliver fuel via port injection on an open intake valve, the enrichment may be delivered via direct injection only.

If further port injection is possible, then at 210, in response to the indication of pre-ignition, the routine includes enriching the pre-igniting cylinder by increasing the split ratio of fuel that is delivered to the cylinder via a port injector on an open intake valve relative to fuel delivered to the cylinder by a direct injector on at least the engine cycle immediately following the detection of pre-ignition. As elaborated below, the amount of fuel delivered via both port injection and direct injection may be increased, the increasing adjusted so that the effective increase in port injection for the engine cycle immediately following the detection of pre-ignition is higher than the effective increase for direct injection for that engine cycle, and thereby the split ratio for port injection relative to direct injection is increased for at least that engine cycle. In one example, increasing the ratio of port injection includes increasing the pulse width of the port injector and delivering the port injected fuel on an open intake valve. For example the port injector may be operated at the upper limit on the engine cycle immediately following the detection of pre-ignition and the port injection timing may be moved from an exhaust stroke to an intake stroke. A remainder of the determined enrichment on the given engine cycle may be provided via the direct injector on the intake stroke.

Next at 214, for a number of engine enrichment cycles, a fuel injection ratio may be adjusted. Specifically, for a number of engine cycles, a split ratio of fuel delivered via port injection relative to direct injection may be adjusted while operating the engine at richer than stoichiometry. The split ratio may be adjusted to increase charge cooling before air enters the cylinder. For example, a ratio of fuel delivered via direct injection on the intake stroke (relative to the compression stroke) may be increased. Fuel delivered via port injection may also be increased, but relatively less. Alternatively, fuel delivered via port injection may be correspondingly decreased. In one example, the adjusting may include maintaining fueling with the higher direct injection ratio for the number of engine cycles. In another example, the adjusting may include initially increasing the direct injection ratio for a first number of engine cycles and then gradually decreasing the direct injection ratio while correspondingly increasing the port injection ratio. The ratios may be retrieved from a look-up table wherein relative fuel injection proportions are stored as a function of pre-ignition mitigating efficiency. That is, the ratios may be learned based on their success in mitigating further pre-ignition events that could have been part of a burst of pre-ignition events. Thus, if the applied ratio is able to mitigate further pre-ignition, the ratio may be learned as a function of engine speed-load conditions, and further based as a function of the pre-ignition indication. On a subsequent indication of pre-ignition under same operating conditions, the learned enrichment may be applied. If the applied ratio is not able to mitigate further pre-ignition, the ratio may be updated (e.g., the direct injection amount may be increased) and re-learned. On a subsequent indication of pre-ignition under same operating conditions, the updated enrichment may be applied. The ratios may then be adaptively updated, as explained below.

For example, the ratio of port fuel injection on an open intake valve may be learned to a clip where no additional charge cooling is possible with port fuel injection. The number of enrichment cycles and enrichment values (e.g., degree of richness) may be learned based on whether any further pre-ignition events happen after fueling stops (e.g., if any pre-ignition occurs within 1-2 cycles after returning to normal, stoichiometric fueling). If pre-ignition does recur, on the next iteration, the enrichment may be increased by a factor, such as by 1 enrichment event. If no further pre-ignition happens on subsequent combustion events, the number of enrichment cycles may be maintained, or alternatively, after multiple episodes without any pre-ignition occurring upon ending the enrichment, the number of enrichment events may be decreased by an event. In this way, the enrichment value may be continually modified based on the likelihood of pre-ignition and the efficacy of the enrichment in mitigating the pre-ignition.

Returning to 208, if the pulse width of port fuel injection cannot be further increased on the next combustion cycle, or if the timing of port fuel injection cannot be adjusted quickly enough to port inject fuel on an open intake valve, then at 212, the routine includes enriching the pre-igniting cylinder by increasing the ratio of fuel that is delivered to the cylinder via a direct injector relative to fuel delivered to the cylinder by a port injector on the engine cycle immediately following the detection of pre-ignition. In particular, the pre-ignition mitigating enrichment is provided via increased direct injection during an intake stroke relative to during a compression stroke. In one example, increasing the ratio of direct injection includes increasing the pulse width of the direct injector while maintaining the pulse width of the port injector. For example the direct injector may be operated at the upper limit on the engine cycle immediately following the detection of pre-ignition. Alternatively, the pulse width of the port injector may be decreased.

From 212, the routine proceeds to 214 wherein, as previously discussed, for a number of engine enrichment cycles, a fuel injection split ratio may be adjusted. Specifically, for a number of engine cycles, a split ratio of fuel delivered via port injection relative to direct injection may be adjusted. For example, a ratio of fuel delivered via direct injection may be increased while the ratio of fuel delivered via port injection is correspondingly decreased and while maintaining engine operation at richer than stoichiometry. In one example, the adjusting may include maintaining fueling with the higher direct injection ratio for the number of engine cycles. In another example, the adjusting may include initially increasing the direct injection ratio for a first number of engine cycles and then gradually decreasing the direct injection ratio while correspondingly increasing the port injection ratio. In still a further example, the adjusting may include increasing the amount of fuel delivered via each of the direct injector (during at least an intake stroke) and via the port injection (on an open intake valve). As discussed above, the ratios may be retrieved from a look-up table wherein relative fuel injection proportions are stored as a function of pre-ignition mitigating efficiency. The ratios may then be adaptively updated. The fuel injection ratio adjustment performed after an initial increase in port injection ratio (as at 210) may be different from the fuel injection ratio performed after an initial increase in direct injection ratio (as at 212). For example, the adjusting may include first increasing the amount of fuel delivered via direct injection until a direct injection limit is reached (e.g., a limit for increasing charge cooling beyond which further addition of fuel via direct injection does not improve charge cooling ability). Then, while maintaining the direct injection amount at the limit, the amount of port fuel injection may be increased to a limit. Additional fuel beyond these limits may be delivered and may act as a diluent. Further, the number of enrichment cycles for the direct injection versus the port injection may be different. Specifically, the controller may assess which form of fuel injection is most effective (e.g., direct injection) and use that as the main control, and then adjust the number of port injection cycles. For example based on the feedback, the number of port injected and direct injected cycles may be increased. Then, on the next event, the PFI amount may be reduced, then the DI amount may be reduced. If a pre-ignition event occurs after the mitigation, both port and direct injection amounts may be increased again with the port injection increased by 1 event and the direct injection increased by 1 event. Then, if no further pre-ignition occurs, the port injection may be decreased by 1 event and the direct injection may be decreased by 1 event.

From 214, the routine proceeds to 216 wherein after the determined number of engine enrichment cycles have elapsed, it is determined if there is any further indication of pre-ignition. For example, it may be determined if there is a burst of pre-ignition events that were not sufficiently mitigated via the initial enrichment and fuel injection adjustment. If no further pre-ignition is determined, nominal cylinder fueling based on engine operating conditions may be resumed at 218. In addition, the split fuel injection ratio applied during the preceding pre-ignition mitigation may be learned and the split fuel ratio look-up table may be updated. If further pre-ignition is detected, then at 220, the routine includes further adjusting the split fuel injection ratio to further increase cylinder charge cooling. For example, an amount of fuel delivered via direct injection may be increased while the amount of fuel delivered via port injection may be correspondingly decreased. In addition, the revised split fuel injection ratio may be learned and the split fuel ratio look-up table may be updated.

In this way, in response to an indication of pre-ignition, a controller may enrich a cylinder by transiently increasing a ratio of port injected fuel relative to direct injected fuel for a number of enrichment cycles, and thereafter increasing the ratio of direct injected fuel relative to port injected fuel. Herein, the selectively increasing the ratio of port injected fuel includes selectively increasing a pulse width of a port injector coupled to the cylinder while maintaining a pulse width of a direct injector coupled to the cylinder. The pulse width of the port injector is selectively increased if the increased pulse width is within an operating limit of the port injector. In addition to increasing the pulse width of the port injection, the port injector timing is shifted from injecting on a closed valve event (e.g., exhaust stroke) to injecting on an open valve event (e.g., intake stroke). If the increased pulse width is outside the operating limit of the port injector, the controller may increase the pulse width of the port injector to the operating limit, and thereafter increase the pulse width of the direct injector while maintaining the pulse width of the port injector at the operating limit. In still other examples, the pulse width of both the port injector and the direct injector may be increased. In each case, the increasing is based on the indication of pre-ignition. Thus, when the indication of pre-ignition is received on a first engine cycle, the pulse width of port injection is increased at least on a second engine cycle immediately following the first engine cycle. Thereafter, the pulse width of direct injection may be increased at least on a number of subsequent engine cycles.

Now turning to FIGS. 3-4, example fuel injection adjustments are shown.

FIG. 3 shows a map 300 of valve timing and piston position, with respect to an engine position, for consecutive engine cylinder combustion cycles. Map 300 depicts events occurring during a portion of a first and a second combustion cycle that may occur in successively firing cylinders. An engine controller may be configured to adjust a fuel injection profile of fuel delivered to the cylinders during each combustion cycle based on operating conditions. In particular, fuel may be delivered as a first injection profile 310 during the second combustion cycle in response to no indication of pre-ignition being received in the first combustion cycle. Fuel may be delivered as a second, different injection profile 320 during the second combustion cycle in response to an indication of pre-ignition 322 ("X") being received in the first combustion cycle. The differing fuel injection profiles may include a portion of the fuel delivered to the cylinder as port injection and a remaining portion of the fuel delivered to the cylinder as direct injection. The timing of the injections as well as a fuel split ratio may vary.

Map 300 illustrates an engine position along the x-axis in crank angle degrees (CAD). Curve 308 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 308, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 302 and 304 depict valve timings for an exhaust valve (dashed curve 302) and an intake valve (solid curve 304) during a normal engine operation. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 306 (or simply, positive valve overlap), represented by a hatched region at the intersection of curves 302 and 304. In one example, the positive intake to exhaust valve overlap 306 may be a default cam position of the engine present during an engine cold start.

Fuel injection profile 310 depicts an example fuel injection profile that may be used in response to no indication of pre-ignition. Herein, a fuel split ratio is adjusted based on nominal engine operating conditions. An engine controller is configured to provide the total amount of fuel to the cylinder as a first port injection (P1, hatched block), and a second direct injection (D2, diagonally striped block). The first port injection includes a first portion of fuel (P1) that is port injected at a first timing CAD1. In particular, the first portion of fuel is port injected during a closed intake valve event (that is, during the exhaust stroke). Then, a remaining portion of the fuel is direct injected (D2) as an intake stroke injection at CAD2. It will be appreciated that in other examples, the direct injected fuel may be provided as a single compression stroke injection, as multiple intake stroke injections, as multiple compression stroke injections, or a combination of at least one intake and at least one compression stroke injection. Spark (star) is provided during the compression stroke. The fuel ratio of P1 and D2 is adjusted based on intake airflow so that combustion air-fuel ratio is at or around stoichiometry. As one example, fuel is delivered at a ratio of 30% port injection (P1):70% direct injection (D2).

Fuel injection profile 320 depicts an example fuel injection profile that may be used in response to an indication of pre-ignition 322. Herein, pre-ignition may be detected during the preceding combustion cycle as an abnormal combustion event (or a series of abnormal combustion events) occurring before a cylinder spark event. In response to pre-ignition 322 being detected in combustion cycle 1, fuel injection is adjusted in combustion cycle 2 to enrich the cylinder. In addition, a fuel split ratio is immediately adjusted. In particular, a pre-ignition mitigating enrichment (e.g., degree of richness) may be determined based on the intensity of the pre-ignition event. For example, as the intensity increases, the degree of richness of the mitigating enrichment may be increased. At least a portion of the enrichment may then be provided via the port injector, allowing the charge cooling properties of port injection to be leveraged while reducing the exhaust particulate matter emissions. In the depicted example, the port injector pulse width may not be limited and a further increase in port injection pulse width may be possible. Accordingly, the fuel split ratio is adjusted on combustion cycle 2 to increase the amount of fuel delivered via port injection on an open intake valve while also increasing the amount of fuel delivered via direct injection in an intake stroke. An engine controller is configured to provide the total amount of fuel enrichment to the cylinder as a first port injection (P11, hatched block), and a second direct injection (D12, diagonally striped block). The total fuel delivered via the enrichment (P11+D12) may be twice the amount of fuel delivered before the indication of pre-ignition (P1+D2). The first port injection includes a first portion of fuel (P11) that is port injected at a first timing CAD11. In addition, the timing of the port injection is transitioned from an exhaust stroke to an intake stroke. In particular, the first portion of fuel is port injected during an open intake valve event (that is, during the intake stroke) to enhance the charge cooling effect of the injection. Then, a remaining portion of the fuel is direct injected as an intake stroke injection D12 at CAD12. As one example, fuel enrichment is delivered at a ratio of 33% port injection (P11):66% direct injection (D12). Herein, the change in port injection amount (P1 to P11) is higher than the change in direct injection amount (D1 to D12). In one example, at P1, the port injector is operating below the pulse width (upper) limit while at P11, the port injector is operating at the pulse width (upper) limit. In an alternate example, where port fuel injection may not provide further charge cooling benefits, the fuel enrichment may be delivered at a ratio of 20% port injection (P11):80% direct injection (D12). It will be appreciated that in examples where the direct injected fuel at 310 was being delivered as an intake stroke direct injection and a compression stroke direct injection, in response to the indication of pre-ignition, the direct injected fuel at 320 may be delivered as an intake stroke injection only to increase the charge cooling effect of the injection. Spark (star) is provided during the compression stroke. The fuel ratio of P11 and D12 is then further adjusted on a number of subsequent combustion cycles to provide charge cooling while combustion air-fuel ratio is held at richer than stoichiometry, as elaborated at FIG. 4. Thus, in the example of FIG. 3, pre-ignition is indicated in a first engine cycle, and a pre-ignition mitigating enrichment with an increased ratio of port fuel injection is performed on a second engine cycle immediately following the first engine cycle.

Now turning to FIG. 4, map 400 shows example fuel injection profiles 402-407 that may be used on combustion events following a combustion event where an indication of pre-ignition is received. As elaborated herein, the injection profiles may be adjusted for a number of combustion events since the detection of pre-ignition to advantageously use the properties of both the port injected fuel and the direct injected fuel in charge cooling. As such, each injection profile depicts a timing of injection relative to a cylinder piston position. Based on the position of the cylinder's piston at any time in the engine cycle, fuel may be injected into the cylinder during an intake stroke (I), a compression stroke (C), a power stroke (P), or an exhaust stroke (E). The injection profile further depicts a ratio of fuel that was injected via port injection (hatched blocks) relative to via direct injection (diagonally striped block).

A fuel injection profile during a first combustion event is shown at 401. During the first combustion event, a portion of fuel is injected into the cylinder as a first port injection (hatched block) during a closed intake valve event (that is, during an exhaust stroke of a previous cylinder combustion event) while a remaining portion of the fuel is injected as an intake stroke direct injection. In one example, 30% of the fuel injection may be delivered as a port injection during a closed intake valve event (e.g., during an exhaust stroke), while a remaining 70% of the fuel injection is delivered as an intake stroke direct injection. The fuel injection amount is further adjusted based on engine airflow so as to maintain an air-fuel ratio around stoichiometry.

Due to the operating conditions during the first combustion event, a pre-ignition event 422 ("X") occurs during this combustion event, specifically before a spark event 412 (indicted by star). In response to pre-ignition event, during a second combustion event immediately following the first event, fuel may be delivered to the engine as per one of injection profile 402 (on combustion event 2) or injection profile 403 (on alternate combustion event 2'). Injection profile 402 may be applied when increased port injection is possible, such as when the port injector is operating within a pulse width limit. Else, injection profile 403 may be applied when increased port injection is not possible, such as when the port injector is operating at a pulse width limit.

Second fuel injection profile 402 depicts an example pre-ignition mitigating fuel enrichment wherein an amount of fuel delivered is increased by increasing the ratio of fuel delivered by the port injector while also delivering the port injected fuel during an open intake valve event (such as in the intake stroke instead of the exhaust stroke). In addition, an amount of fuel delivered via the direct injector is also increased. As an example, during an engine cycle immediately following pre-ignition detection, 33% of the fuel is port injected into the cylinder during an open intake valve while 66% of the fuel is injected as an intake stroke direct injection, wherein the total amount of fuel delivered responsive to the indication of pre-ignition is double the total amount of fuel delivered prior to the indication of pre-ignition.

Third fuel injection profile 403 depicts an example pre-ignition mitigating fuel enrichment wherein an amount of fuel delivered is increased by increasing the ratio of fuel delivered by the direct injector while delivering a remainder of the enrichment as a port injection during a closed intake valve event (such as in the exhaust stroke). As an example, during an engine cycle immediately following pre-ignition detection where an increase in port injection is not possible, 10% of the fuel is port injected into the cylinder on a closed intake valve while 90% of the fuel is injected as an intake stroke direct injection.

On a subsequent number of combustion events (combustion events 3-n) following the second combustion event, fuel may be delivered as per injection profiles 404-406 respectively. Therein, following the initial increase in charge cooling via port or direct injection, a split ratio of fuel injection is continually adjusted on each engine cycle so that a charge cooling effect is extended and further pre-ignition is pre-empted. For example, over the number of subsequent combustion events, an overall enrichment may be decreased and/or a ratio of port injection may be gradually decreased.

Further still, port injection timing may be adjusted such that it gradually returns into the exhaust stroke from the intake stroke. It will be appreciated that in alternate examples, injection profile 402 (or 402') may be maintained for the entirety of the determined number of enrichment cycles (till combustion event n) and then injection profile 401 may be resumed (at combustion event n+1). If injection profile 402' was applied at combustion event 2', a ratio of direct injection is gradually decreased. The profiles are adjusted such that by combustion event n, nominal injection conditions are resumed. At combustion event n+1, stoichiometric fueling is resumed.

In one example, during a first pre-ignition mitigating enrichment, where a port injector pulse-width can be increased, a controller may enrich the cylinder by increasing the amount of fuel delivered via each of the port and direct injector so as to increase a ratio of port injected fuel relative to direct injected fuel for at least the first enrichment cycle. In comparison, during a second pre-ignition mitigating enrichment, where the port injector pulse-width cannot be increased, the controller may enrich the cylinder by increasing the amount of fuel delivered via each of the port and direct injector so as to increase the ratio of direct injected fuel relative to port injected fuel. During the first enrichment, the port injector pulse-width is within an operating limit, and the port injected fuel is delivered during an open intake valve event, while during the second enrichment, the port injector pulse-width is at the operating limit and the port injected fuel is delivered during a closed intake valve event. Further, during the first enrichment, the ratio of port injected fuel is increased for a first number of engine cycles, while during the second enrichment, the ratio of direct injected fuel is increased for a second number of engine cycles larger than the first number of engine cycles. After each of the first and second enrichments, a ratio of port injected fuel relative to direct injected fuel is adjusted for a number of engine cycles, the adjusting including increasing port fuel injection up to a charge cooling limit of the port injection, and thereafter increasing direct injection only. The increasing during each of the first and second enrichments is based on the indication of pre-ignition. In one example, the fuel that is port injected is a first fuel and the fuel that is direct injected is a second, different fuel, and during both the first and second enrichments, the ratio is further adjusted based on the alcohol content of the first fuel and the alcohol content of the second fuel. Specifically, the fuel that provides the most charge cooling and has a higher octane rating may be injected at the higher amount.

In another example, an engine system, comprises an engine cylinder; a direct injector configured to direct inject a fuel into the cylinder; a port injector configured to port inject the fuel into the cylinder; and a knock sensor. The engine system further includes a controller with computer-readable instructions stored on non-transitory memory for: receiving an indication of pre-ignition in the cylinder based on an output of the knock sensor; and in response to the indication, enriching the cylinder. Herein, the enriching includes, for a first number of enrichment cycles operating the engine with an increased ratio of port injected fuel up to the air charge cooling limit, relative to direct injected fuel, the port injected fuel delivered on an open intake valve, and then for a second number of enrichment cycles, transitioning to operating the engine with an increased ratio of direct injected fuel relative to port injected fuel, the port injected fuel delivered on a closed intake valve. The second number of enrichment cycles may be larger than the first number in one example.

In still other examples, in response to an indication of pre-ignition in a cylinder, a controller may enrich the cylinder by operating the cylinder with an increased ratio of port injected fuel relative to direct injected fuel for a first number of enrichment cycles (e.g., one enrichment cycle). The port injected fuel may be delivered on an open intake valve. Thereafter, on subsequent enrichment cycles, the port injection fraction may be increased until port fuel injection on an open intake valve reaches a charge cooling limit and further port injection on the open intake valve does not cool the charge any longer. After the port injection limit is reaches, the port injection may be maintained at the limit and the direct injection amount may be increased on subsequent enrichment cycles. In still another example, the enrichment may include enriching via increasing direct injection and port injection beyond their respective intake charge cooling limits in such a way that the fuel acts as a diluent.

In this way, charge cooling properties of a port injection fuel delivery system may be leveraged in pre-ignition mitigation by increasing a pulse width of port injection in response to an indication of pre-ignition. By addressing pre-ignition by initially delivering a fuel enrichment via a port injector on an open intake valve, cylinder temperatures may be rapidly decreased, reducing the propensity for further cylinder pre-ignition events. Subsequently, fuel enrichment via a direct injector may be used to maintain cooler cylinder temperatures. By adjusting a ratio of fuel delivered to a cylinder via a direct injector and a port injector in response to pre-ignition, the amount of direct injected fuel required to address pre-ignition is reduced, providing exhaust particulate matter reduction benefits. Overall, pre-ignition can be mitigated without degrading exhaust emissions.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
differentiating cylinder knocking from pre-ignition based on an output of a knock sensor;
in response to an indication of pre-ignition, enriching a cylinder by selectively increasing a ratio of port injected fuel relative to direct injected fuel for a first number of enrichment cycles of the enriching; and then after the first number of enrichment cycles, while maintaining engine operation richer than stoichiometry, increasing a ratio of direct injected fuel relative to port injected fuel for a second number of enrichment cycles of the enriching.

2. The method of claim 1, wherein selectively increasing the ratio of port injected fuel includes selectively increasing a pulse width of a port injector coupled to the cylinder while maintaining a pulse width of a direct injector coupled to the cylinder, the method further comprising addressing the cylinder knocking using adjustments of spark ignition timing and EGR.

3. The method of claim 2, wherein selectively increasing the pulse width of the port injector includes increasing the pulse width of the port injector to or towards an operating limit if the increased pulse width is within the operating limit of the port injector.

4. The method of claim 3, further comprising, if the increased pulse width is outside the operating limit of the port injector, increasing the pulse width of the direct injector while maintaining the pulse width of the port injector at the operating limit.

5. The method of claim 2, wherein the indication of pre-ignition in the cylinder includes the output of the knock sensor estimated in a first window before a spark ignition event of the cylinder being larger than a pre-ignition threshold, and wherein the increasing is based on the output of the knock sensor relative to the pre-ignition threshold.

6. The method of claim 2, wherein the indication of pre-ignition is received on a first engine cycle and wherein the pulse width is increased on a second engine cycle immediately following the first engine cycle.

7. The method of claim 1, wherein increasing the ratio of port injected fuel includes increasing an amount of fuel that is port injected during an open intake valve event.

8. The method of claim 5, wherein the first number of enrichment cycles is based on the output of the knock sensor relative to the pre-ignition threshold.

9. The method of claim 1, wherein increasing the ratio of port injected fuel includes correspondingly decreasing the ratio of direct injected fuel.

10. The method of claim 1, wherein the fuel that is port injected is a first fuel and wherein the fuel that is direct injected is a second, different fuel.

11. The method of claim 10, wherein the ratio is further adjusted based on an alcohol content of the first fuel relative to the second fuel.

12. A method, comprising:
in response to cylinder pre-ignition differentiated from knock, mitigating the pre-ignition by enriching a cylinder; and
during a first pre-ignition mitigating enrichment, where a port injector pulse-width can be increased, increasing a ratio of port injected fuel relative to direct injected fuel and then increasing a ratio of direct injected fuel relative to port injected fuel while maintaining engine operation richer than stoichiometry; and
during a second pre-ignition mitigating enrichment, where the port injector pulse-width cannot be increased, increasing the ratio of direct injected fuel relative to port injected fuel and then increasing the ratio of port injected fuel relative to direct injected fuel while maintaining engine operation richer than stoichiometry.

13. The method of claim 12, wherein during the first enrichment, the port injector pulse-width is within an operating limit and the port injected fuel is delivered during an open intake valve event, and wherein during the second enrichment, the port injector pulse-width is at the operating limit and the port injected fuel is delivered during a closed intake valve event.

14. The method of claim 12, wherein during the first enrichment, the ratio of port injected fuel is increased for a first number of engine cycles, and wherein during the second enrichment, the ratio of direct injected fuel is increased for a second number of engine cycles larger than the first number of engine cycles.

15. A method comprising,
during a first pre-ignition mitigating enrichment, where a port injector pulse-width can be increased, increasing a ratio of port injected fuel relative to direct injected fuel into a cylinder;
during a second pre-ignition mitigating enrichment, where the port injector pulse-width cannot be increased, increasing a ratio of direct injected fuel relative to port injected fuel into the cylinder; and
after each of the first and second enrichments, adjusting the ratio of port injected fuel relative to direct injected fuel for a number of engine cycles while maintaining engine operation richer than stoichiometry, the adjusting including increasing port injection until a charge cooling limit is reached, and thereafter increasing direct injection only.

16. The method of claim 12, wherein the increasing during each of the first and second enrichments is based on an indication of pre-ignition.

17. The method of claim 12, wherein the fuel that is port injected is a first fuel and wherein the fuel that is direct injected is a second, different fuel, and wherein during both the first and second enrichments, the ratio is further adjusted based on an alcohol content of the first fuel and an alcohol content of the second fuel.

18. An engine system, comprising:
an engine cylinder;
a direct injector configured to direct inject a fuel into the cylinder;
a port injector configured to port inject the fuel into the cylinder;
a knock sensor for differentiating cylinder knocking from cylinder pre-ignition; and
a controller with computer-readable instructions stored on non-transitory memory for:
receiving an indication of pre-ignition in the cylinder based on an output of the knock sensor in a first window before a spark ignition event of the cylinder being larger than a pre-ignition threshold; and in response to the indication of pre-ignition different from knocking, enriching the cylinder, wherein the enriching includes, for a first number of enrichment cycles, operating an engine with an increased ratio of port injected fuel relative to direct injected fuel, the port injected fuel delivered on an open intake valve, and then for a second number of enrichment cycles, transitioning to operating the engine with an increased ratio of direct injected fuel relative to port injected fuel, the port injected fuel delivered on a closed intake valve.

19. The system of claim 18, wherein the second number is larger than the first number, and wherein the controller includes further instructions for:

receiving an indication of knocking in the cylinder based on the output of the knock sensor in a second window after the spark ignition event of the cylinder being larger than a knock threshold, the knock threshold lower than the pre-ignition threshold; and addressing the cylinder knocking using spark ignition timing adjustments and EGR.

\* \* \* \* \*